(12) United States Patent
Podshivalov et al.

(10) Patent No.: US 8,660,792 B2
(45) Date of Patent: *Feb. 25, 2014

(54) METHOD AND APPARATUS FOR DISTRIBUTION OF SATELLITE NAVIGATION DATA

(75) Inventors: Sergei Podshivalov, San Jose, CA (US); Charles Abraham, Los Gatos, CA (US)

(73) Assignee: Global Locate, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/094,984

(22) Filed: Apr. 27, 2011

(65) Prior Publication Data

US 2012/0105281 A1    May 3, 2012

Related U.S. Application Data

(63) Continuation of application No. 10/719,890, filed on Nov. 21, 2003, now Pat. No. 7,945,387.

(51) Int. Cl.
  *G06F 19/00* (2011.01)
  *G01C 21/00* (2006.01)

(52) U.S. Cl.
  USPC ........... 701/482; 701/483; 701/487; 701/519; 342/386; 342/357

(58) Field of Classification Search
  USPC ......... 701/468, 476, 471, 485, 400, 408, 482, 701/483, 487, 491, 519; 342/357.09, 342/357.12, 386, 357
  See application file for complete search history.

(56) References Cited

U.S. PATENT DOCUMENTS

| | | | |
|---|---|---|---|
| 4,445,118 A * | 4/1984 | Taylor et al. | 342/357.395 |
| 5,901,178 A | 5/1999 | Lee et al. | |
| 6,091,959 A * | 7/2000 | Souissi et al. | 340/7.46 |
| 6,185,427 B1 * | 2/2001 | Krasner et al. | 455/456.2 |
| 6,215,441 B1 * | 4/2001 | Moeglein et al. | 342/357.25 |
| 6,496,477 B1 | 12/2002 | Perkins et al. | |
| 6,560,534 B2 * | 5/2003 | Abraham et al. | 701/484 |
| 6,799,116 B2 * | 9/2004 | Robbins | 701/469 |
| 6,813,560 B2 * | 11/2004 | van Diggelen et al. | 701/470 |
| 6,904,110 B2 | 6/2005 | Trans et al. | |
| 6,985,454 B1 * | 1/2006 | Wiedeman et al. | 370/316 |
| 7,640,103 B2 * | 12/2009 | Abraham et al. | 701/537 |
| 7,945,387 B2 * | 5/2011 | Podshivalov et al. | 701/468 |
| 2002/0016674 A1 * | 2/2002 | Rudow et al. | 701/215 |
| 2002/0024461 A1 * | 2/2002 | Moeglein et al. | 342/357.1 |
| 2002/0032526 A1 * | 3/2002 | Diggelen | 701/213 |
| 2002/0105459 A1 * | 8/2002 | Diggelen | 342/357.09 |
| 2004/0049326 A1 * | 3/2004 | Diggelen et al. | 701/13 |
| 2009/0168813 A1 | 7/2009 | Crookes et al. | |
| 2009/0323547 A1 | 12/2009 | Caesar et al. | |
| 2010/0066606 A1 | 3/2010 | Abraham et al. | |
| 2010/0220644 A1 | 9/2010 | Reznik et al. | |

\* cited by examiner

*Primary Examiner* — Ronnie Mancho
(74) *Attorney, Agent, or Firm* — Sterne, Kessler, Goldstein & Fox P.L.L.C.

(57) ABSTRACT

A method and apparatus for distributing satellite navigation data is described. In one example, satellite signals are processed at each of a plurality of reference stations to receive a respective plurality of satellite navigation data streams. Packets are formed in response to said plurality of satellite navigation data streams to generate a plurality of packetized satellite navigation data streams. The packetized satellite navigation data streams are sent to a processing system. The processing system removes duplicate packets within said plurality of packetized satellite navigation data streams to generate a combined packet stream. The combined packet stream is then sent into a communication network.

20 Claims, 6 Drawing Sheets

US 8,660,792 B2

METHOD AND APPARATUS FOR DISTRIBUTION OF SATELLITE NAVIGATION DATA

CROSS-REFERENCE TO RELATED APPLICATIONS

This application is a continuation of U.S. patent application Ser. No. 10/719,890 (now U.S. Pat. No. 7,945,387), which was filed on Nov. 21, 2003.

BACKGROUND OF THE INVENTION

1. Field of the Invention

The present invention generally relates to satellite position location systems and, more particularly, to distributing satellite navigation data.

2. Description of the Related Art

A satellite signal receiver for the Global Positioning System (GPS) uses measurements from several satellites to compute a position. The process of acquiring the GPS radio signal is enhanced in speed and sensitivity if the GPS receiver has prior access to a model of the satellite orbit and clock. This model is broadcast by the GPS satellites and is known as the satellite navigation message. Once the GPS radio signal has been acquired, the process of computing position requires the use of information contained within the satellite navigation message.

The GPS satellite navigation message is transmitted in 1500-bit frames at 50 bits per second, as defined by ICD-GPS-200C. Thus, each frame is transmitted in 30 seconds. The 1500-bit frame of each broadcast includes five sub-frames of 300 bits length. The first three sub-frames (i.e., the first 900 bits) include the ephemeris information associated with the particular broadcasting satellite. The ephemeris information contains precise satellite orbit and time model information for a particular satellite. The first three sub-frames are identically repeated in each 1500-bit frame for a particular duration. The broadcast ephemeris information is typically valid for two to four hours into the future (from the time of broadcast) and is periodically updated by a satellite control station. The fourth and fifth sub-frames contain part of a satellite almanac, which includes coarse ephemeris and time model information for the entire satellite constellation. The contents of the fourth and fifth sub-frames change until the entire almanac is transmitted. The repetition period of the fourth and fifth sub-frames is 12.5 minutes (i.e., the entire satellite almanac is contained in 15,000 bits).

It is always slow (no faster than 18 seconds), frequently difficult, and sometimes impossible (in environments with very low signal strengths), for a GPS receiver to download ephemeris information from a satellite. For these reasons, it has long been known that it is advantageous to send the ephemeris to a GPS receiver by some other means in lieu of awaiting the transmission from the satellite. U.S. Pat. No. 4,445,118, issued Apr. 24, 1984, describes a technique that collects ephemeris information at a GPS reference station, and transmits aiding data to the remote GPS receiver via a wireless transmission. This technique of providing aiding data to a GPS receiver has become known as "Assisted-GPS".

Presently, A-GPS reference stations receive ephemeris data for in-view satellites and store the entire ephemeris model (e.g., 900 bits) as a data file for distribution. The data file containing the ephemeris is transmitted to the remote receiver at some time after the initial collection of the data (e.g., minutes later). This latency between collection and distribution of the ephemeris data may deleteriously affect operation of the remote receiver. For example, the ephemeris data in use by the remote receiver may become invalid due to an unhealthy satellite. The remote receiver, however, will continue to use the invalid ephemeris data for several minutes before receiving updated ephemeris data from the server.

Therefore, there exists a need in the art for a method and apparatus that distributes satellite navigation data to a remote receiver with decreased latency.

SUMMARY OF THE INVENTION

The disadvantages associated with the prior art are overcome by a method and apparatus for distributing satellite navigation data. In one embodiment, satellite signals are processed at each of a plurality of reference stations to receive a respective plurality of satellite navigation data streams. Packets are formed in response to said plurality of satellite navigation data streams to generate a plurality of packetized satellite navigation data streams. The packetized satellite navigation data streams are sent to a processing system. The processing system removes duplicate packets within said plurality of packetized satellite navigation data streams to generate a combined packet stream. The combined packet stream is then sent into a communication network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate, understanding, identical reference numerals have been used, wherever possible, to designate identical elements that are common to the figures.

DETAILED DESCRIPTION OF THE INVENTION

Figure 1:
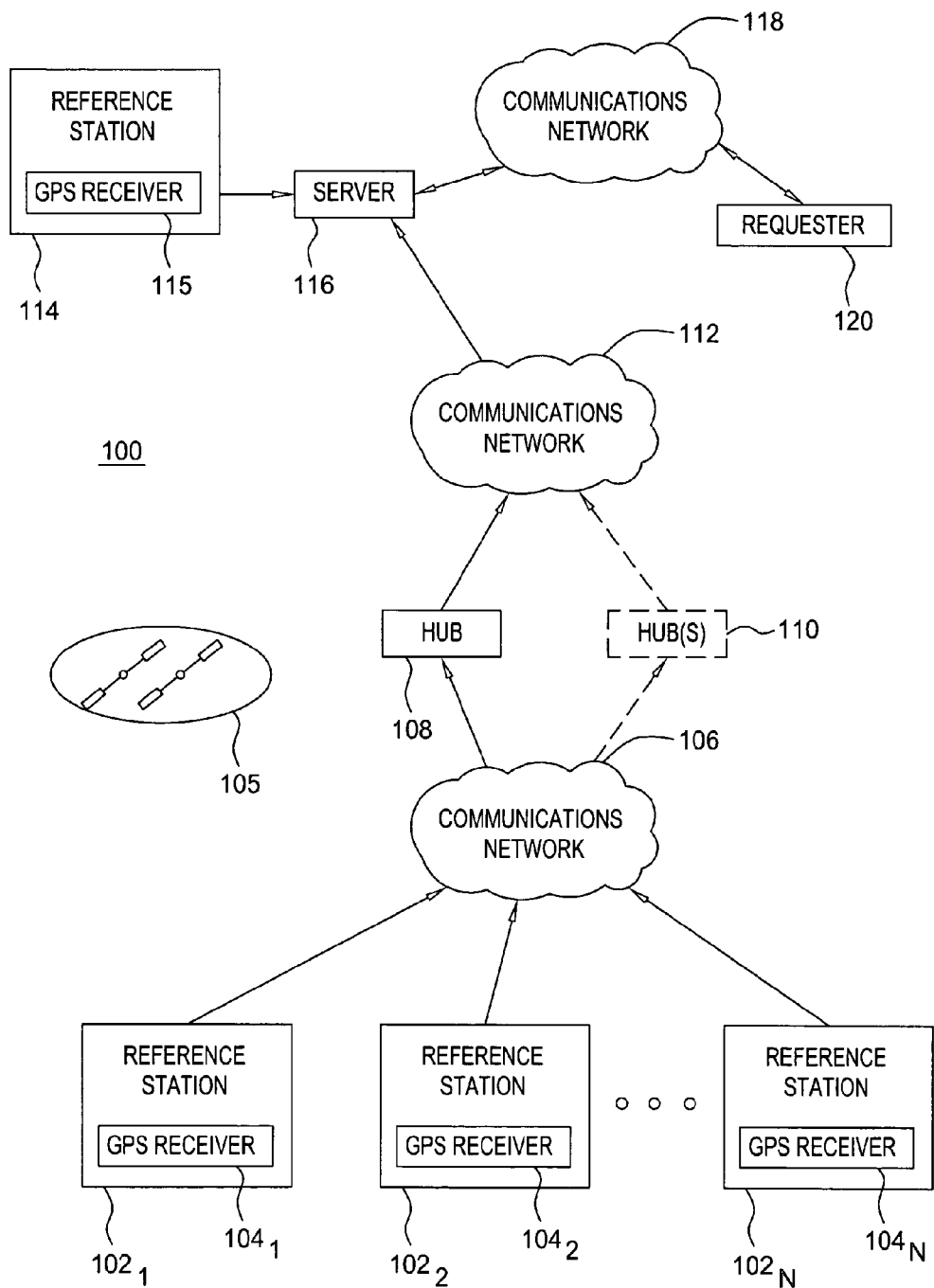
FIG. 1 is a block diagram depicting an exemplary embodiment of a satellite navigation data distribution system.

FIG. 1 is a block diagram depicting an exemplary embodiment of a satellite navigation data distribution system 100. The system 100 comprises a plurality of reference stations $102_1$ through $102_N$ (collectively referred to as reference stations 102), a hub 108, and a server 116. The reference stations 102 receive satellite navigation data from a plurality of satellites 105. The hub 108 collects the satellite navigation data from the reference stations 102 and provides the satellite navigation data to the server 116. The server 116 processes the satellite navigation data to decode the various parameters defined therein. The server 116 may then transmit information extracted from the satellite navigation data to a requester 120.

More specifically, each of the reference stations $102_1$ through $102_N$ includes a respective one of GPS receivers $104_1$ through $104_N$ (collectively referred to as satellite signal receivers 104) for receiving signals from satellites of the plurality of satellites 105 that are in-view. Each of the GPS receivers 104 decodes the received satellite signals to obtain satellite navigation data associated with the in-view satellites. The satellite navigation data comprises satellite navigation messages that are formatted into frames and sub-frames, as described above. The GPS receivers 104 are capable of streaming raw satellite navigation messages in real time. For example, certain NovAtel GPS receivers have this capability.

The reference stations 102 format the satellite navigation data streams produced by the GPS receivers 104 for transmission over the communications network 106 to the hub 108. In one embodiment, the reference stations 102 process the data streams to form packet streams comprising internet protocol (IP) packets, which may be transmitted over the communication link 106 using the uniform datagram protocol (UDP). The hub 108 processes the formatted data streams from the reference stations 102 ("reference station data streams") to remove redundant information. The hub 108 produces a formatted data stream comprising the unique information from the reference station data streams satellite navigation data from the reference stations 102 ("hub data stream"). The hub 108 transmits the hub data stream to the server 116 using a communication network 112. In one embodiment of the invention, one or more additional hubs ("hub(s) 110") are used to provide redundancy. The hub(s) 110 operate in the same manner as the hub 108. Each of the communication networks 106 and 112 may comprise any type of network known in the art, such frame relay, asynchronous transfer mode (ATM) networks, and the like. Although the communication networks 106 and 112 have been shown as separate networks, those skilled in the art will appreciate that networks 106 and 112 may comprise a single network.

In one embodiment, another reference station 114 may be disposed in proximity to the server 116. The reference station 114 includes a GPS receiver 115 similar to the GPS receivers 104, and provides a formatted data stream similar to those provided by the reference stations 102 ("co-located reference station data stream"). The server 116 processes the hub data stream(s) and the co-located reference station data stream, if available, to extract various parameters therefrom. For example, the server 116 may extract one or more of ephemeris data, almanac data, ionosphere data, universal time (UTC) offset data, satellite health data, as well as the raw data bits comprising the satellite navigation messages. Similar to the hubs 108 and 110, the server 116 may first process the hub data stream(s) and the co-located reference station data streams to remove redundant information. The extracted information may be provided to the requester 120 using a communication network 118. The communication network 118 may comprise a wireless communication network or other type of communication network, such as the Internet.

Figure 2:
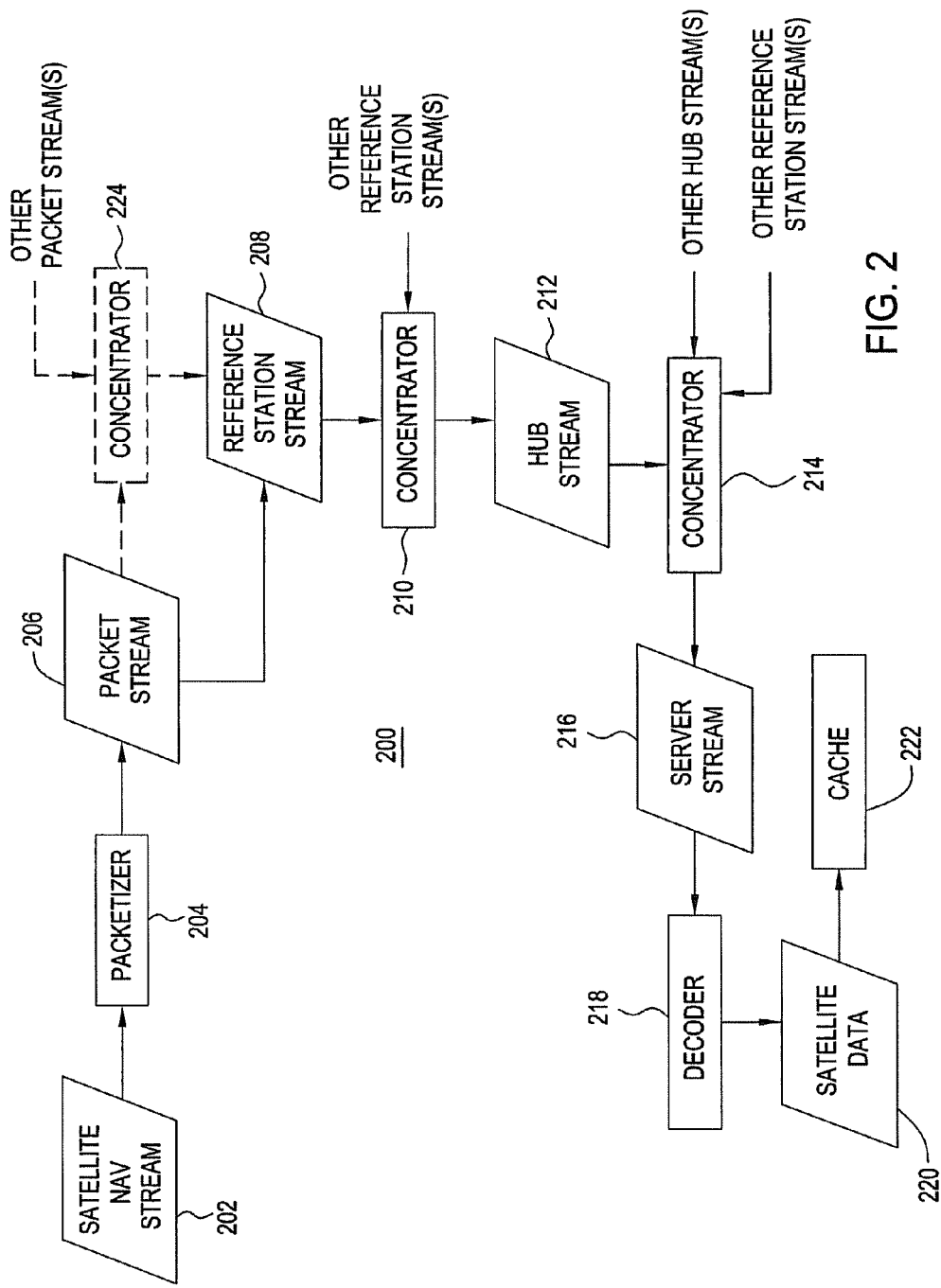
FIG. 2 is a data flow diagram depicting an exemplary embodiment of a process for distributing satellite navigation data from a reference station to a server.

FIG. 2 is a data flow diagram depicting an exemplary embodiment of a process 200 for distributing satellite navigation data from a reference station to a server. The process 200 begins with a satellite navigation data stream 202. The satellite navigation data stream 202 comprises sub-frames of satellite navigation messages broadcast by in-view satellites. The satellite navigation data stream 202 is provided as input to a packetizer 204. The packetizer 204 formats the satellite navigation data stream 202 into a packet stream 206. In one embodiment of the invention, each packet in the packet stream 206 includes a sub-frame of the satellite navigation data stream 202. In addition, each packet in the packet stream 206 includes a header for identifying the sub-frame carried therein. For example, the header may include a satellite identifier and a time-of-week (TOW) value that uniquely identifies the associated sub-frame. The packet stream 206 may be directly output as a reference station data stream 208.

The reference station data stream 208 is provided as input to a concentrator 210. The concentrator 210 also receives reference station data streams from other reference stations. The concentrator 210 processes the reference station data streams to remove packets carrying redundant information. For example, two of the reference stations may be positioned on the surface of the Earth so as to receive the satellite navigation message from the same satellite. The reference station data streams corresponding to these two reference stations will include packets that define identical sub-frames. The redundant sub-frame is not necessary and may be removed. The concentrator 210 provides a hub data stream 212 as output. The hub data stream 212 comprises a packet stream having unique information from the reference stations. For example, the hub data stream 212 may comprise a stream of packets carrying unique sub-frames.

The hub data stream 212 is provided as input to a concentrator 214. The concentrator 214 may also receive additional hub data stream(s), as well as an additional reference station data stream from a reference station co-located with the server. The concentrator 214 operates in a similar manner to the concentrator 210 to generate a server data stream 216. The server data stream 216 comprises a packet stream having unique information from the hubs and the co-located reference station. The server data stream 216 is provided as input to a decoder 218. The decoder 218 processes the server data stream 216 to extract satellite data 220. The satellite data 220 comprises one or more of ephemeris, almanac, ionosphere data, UTC offset, satellite health status, and raw data bits. The satellite data 220 is stored within a cache 222.

In one embodiment of the invention, a reference station may receive a reference station data stream from another reference station. Thus, the packet stream 206 within the reference station may be provided as input to an optional concentrator 224. The concentrator 224 operations in a similar manner to the concentrators 210 and 214 to remove redundant information and provide a unique reference station data stream 208 to the hub.

Figure 3:
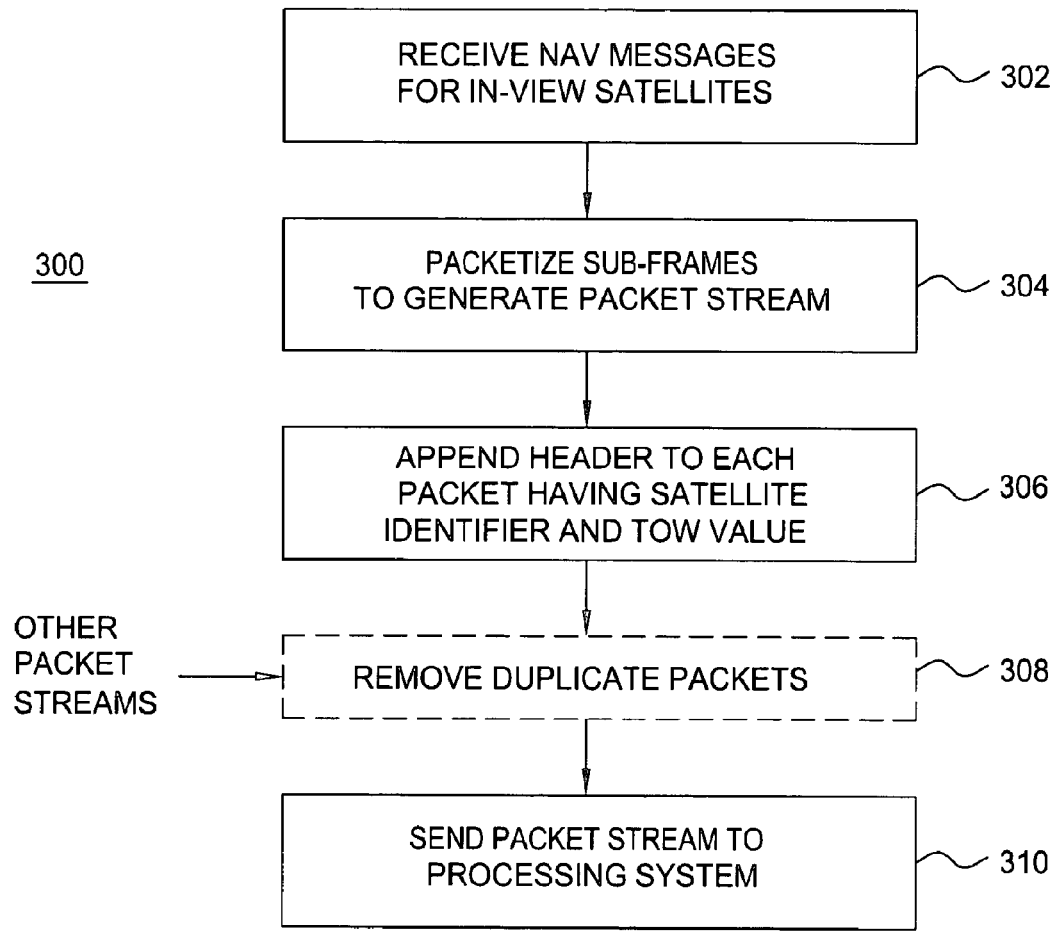
FIG. 3 is a flow diagram depicting an exemplary embodiment of a process for decoding satellite signals to recover satellite navigation data within a reference station.

FIG. 3 is a flow diagram depicting an exemplary embodiment of a process 300 for decoding satellite signals to recover satellite navigation data within a reference station. The process 300 begins at step 302, where satellite navigation messages are received for a plurality of in-view satellites. At step 304, the sub-frames of the satellite navigation messages are packetized to generate a packet stream (e.g., a stream of IP packets). At step 306, a header is added to each packet within the packet stream having a satellite identifier and a TOW value associated with a respective sub-frame. At optional step 308, the packet stream is merged with packet stream(s) from other reference stations and packets carrying redundant sub-frames are removed (e.g., packets having a header with the same satellite identifier and same TOW value). At step 310, the packet stream is transmitted to a hub. For example, the packet stream may be transmitted using UDP.

Figure 4:
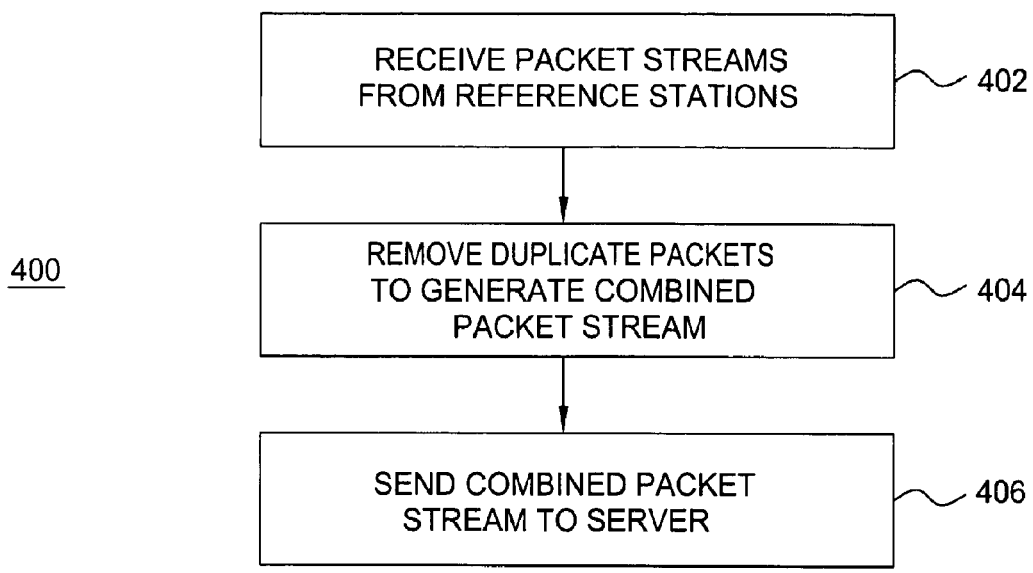
FIG. 4 is a flow diagram depicting an exemplary embodiment of a process for concentrating satellite navigation data within a hub.

FIG. 4 is a flow diagram depicting an exemplary embodiment of a process 400 for concentrating satellite navigation data within a hub. The process 400 begins at step 402, where packet streams are received from a plurality of reference stations. At step 404, packets of the packet streams are analyzed to remove those packets carrying redundant information and merged to produce a hub packet stream. For example, the headers of the packets may be analyzed for identify those headers having the same satellite identifier and the same TOW value. At step 406, the hub packet stream is transmitted to a server. For example, the hub packet stream may be transmitted using UDP.

Figure 5:
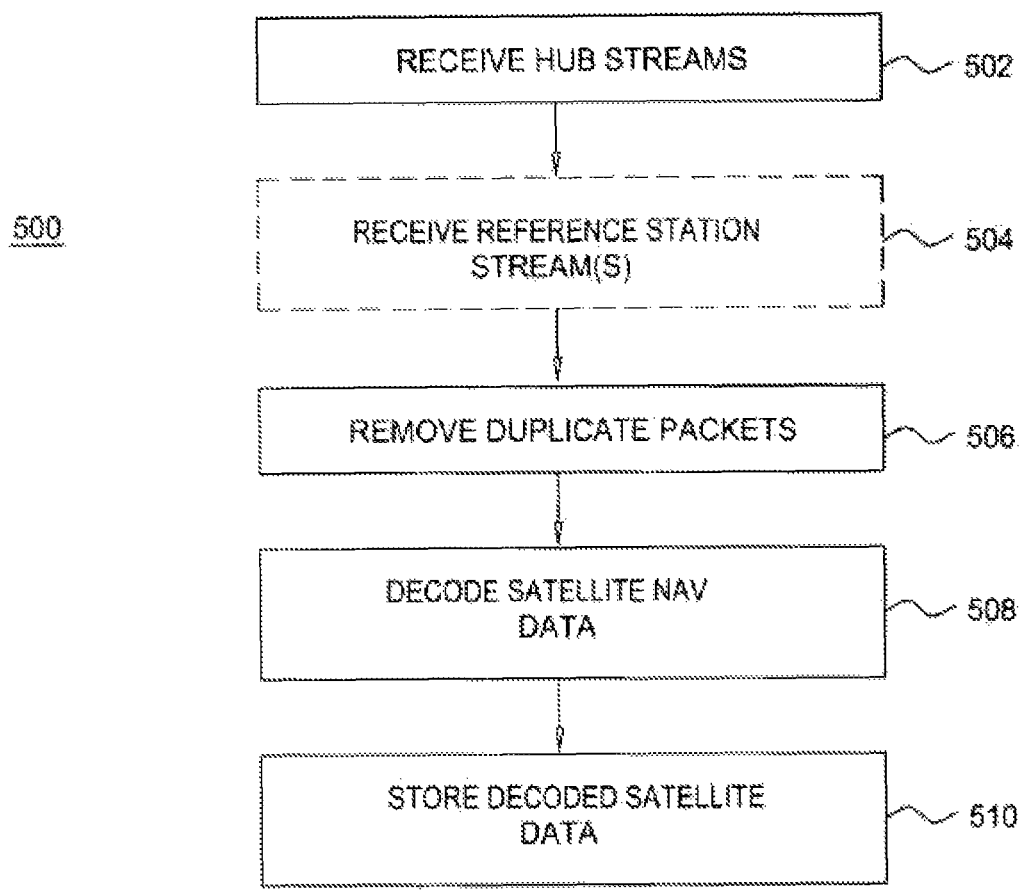
FIG. 5 is a flow diagram depicting an exemplary embodiment of a process for decoding satellite navigation data at a server.

FIG. 5 is a flow diagram depicting an exemplary embodiment of a process 500 for decoding satellite navigation data at a server. The process 500 begins at step 502, where one or more hub data stream(s) are received from one or more hubs. At optional step 504, a reference station data stream is received from a reference station co-located with the server. At step 506, packets of the hub data stream(s) and the optional reference station data are merged to produce a server data stream and packets carrying redundant sub-frames are removed (e.g., packets having a header with the same satellite identifier and same TOW value). At step 508, the satellite navigation data carried by the server data stream is decoded to produce satellite data. At step 510, the satellite data is stored within the server for transmission to a requester.

Figure 6:
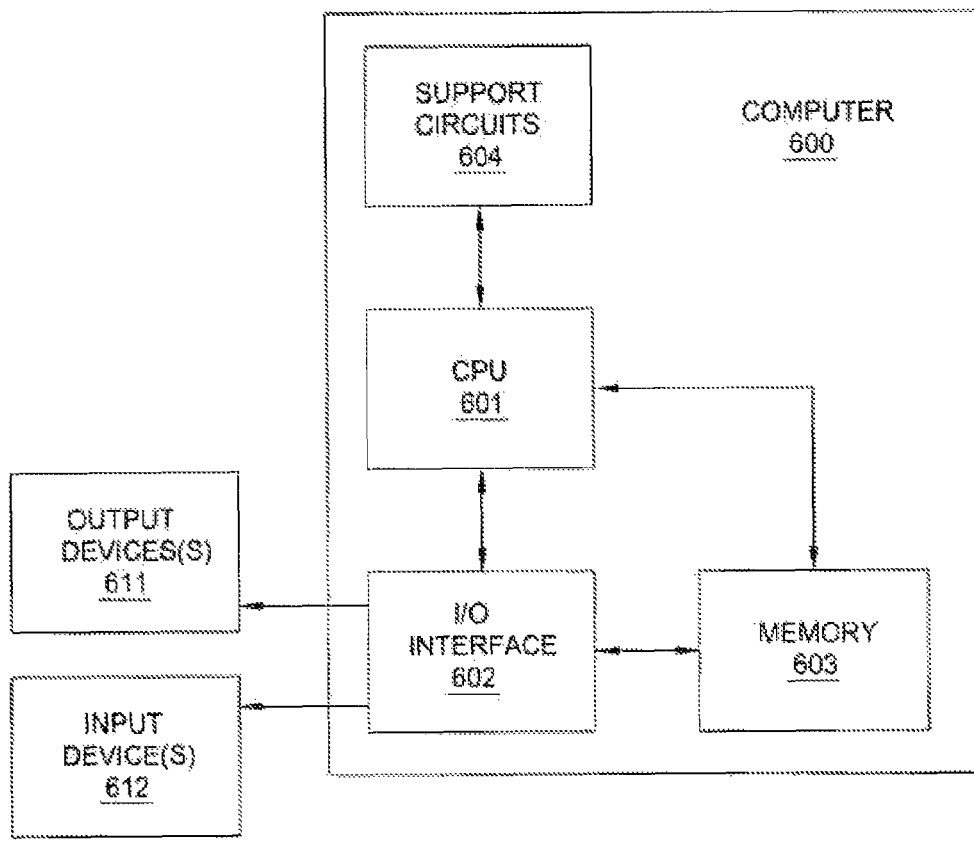
FIG. 6 is a block diagram depicting an exemplary embodiment of a computer for implementing the processes and methods described herein.

FIG. 6 is a block diagram depicting an exemplary embodiment of a computer 600 suitable for implementing processes and methods described above. The computer 600 includes a central processing unit (CPU) 601, a memory 603, various support circuits 604, and an I/O interface 602. The CPU 601 may be any type of microprocessor known in the art. The support circuits 604 for CPU 602 include conventional cache, power supplies, clock circuits, data registers, I/O interfaces, and the like. The I/O interface 602 may be directly coupled to the memory 603 or coupled through the CPU 601. The I/O interface 602 may be coupled to various input devices 612 and output devices 611, such as a conventional keyboard, mouse, printer, display, and the like.

The memory 603 may store all or portions of one or more programs and/or data to implement the processes and methods described above. Although the invention is disclosed as being implemented as a computer executing a software program, those skilled in the art will appreciate that the invention may be implemented in hardware, software, or a combination of hardware and software. Such implementations may include a number of processors independently executing various programs and dedicated hardware, such as application specific integrated circuits (ASICs).

Although the methods and apparatus of the invention have been described with reference to GPS satellites, it will be appreciated that the teachings are equally applicable to positioning systems that utilize pseudolites or a combination of satellites and pseudolites. Pseudolites are ground-based transmitters that broadcast a PN code (similar to the GPS signal) that may be modulated on an L-band carrier signal, generally synchronized with GPS time. The term "satellite", as used herein, is intended to include pseudolites or equivalents of pseudolites, and the term "GPS signals", as used herein, is intended to include GPS-like signals from pseudolites or equivalents of pseudolites.

Moreover, in the preceding discussion, the invention has been described with reference to application upon the United States Global Positioning System (GPS). It should be evident, however, that these methods are equally applicable to similar satellite systems, and in particular, the Russian Glonass system and the European Galileo system. The term "GPS" used herein includes such alternative satellite positioning systems, including the Russian Glonass system and the European Galileo system.

While the foregoing is directed to embodiments of the present invention, other and further embodiments of the invention may be devised without departing from the basic scope thereof, and the scope thereof is determined by the claims that follow.

The invention claimed is:

1. A method of distributing satellite navigation data, comprising:
   processing satellite signals at each of a plurality of reference stations to generate a respective plurality of satellite navigation data streams;
   forming packets in response to said plurality of satellite navigation data streams to generate a plurality of packetized satellite navigation data streams;
   sending each of said plurality of packetized satellite navigation data streams to a processing system;
   removing, at said processing system, duplicate packets within said plurality of packetized satellite navigation data streams to generate combined packet stream; and
   sending said combined packet stream into a communication network.

2. The method of claim 1, further comprising:
   decoding satellite navigation data within said combined packet stream to generate satellite data.

3. The method of claim 2, wherein said satellite data comprises at least one of ephemeris data, almanac data, ionosphere data, universal time offset data, satellite health data, and raw data bits.

4. The method of claim 1, wherein said plurality of satellite navigation data streams comprises global positioning system (GPS) satellite navigation messages, and wherein each of said packets includes a sub-frame of said GPS satellite navigation messages.

5. The method of claim 4, wherein each of said packets includes a header having a satellite identifier and a time-of-week (TOW) value.

6. The method of claim 5, wherein each of said duplicate packets is removed in response to said satellite identifier and said TOW value associated therewith.

7. The method of claim 1, wherein said processing system comprises a hub, and the method further comprises:
   receiving said combined packet stream from said communication network at a position location server.

8. The method of claim 7, further comprising:
   decoding satellite navigation data within said combined packet stream to generate satellite data; and
   storing said satellite data in a cache disposed within said position location server.

9. The method of claim 7, further comprising:
   receiving, at said position location server, at least one additional packetized satellite navigation data stream;
   removing duplicate packets within said combined packet stream and said at least one additional packetized satellite navigation data stream to generate another combined packet stream;
   decoding satellite navigation data within said other combined packet stream to generate satellite data; and
   storing said satellite data in a cache disposed within said position location server.

10. The method of claim 9, wherein said at least one additional packetized satellite navigation data stream is generated by at least one of an additional hub and a reference station disposed proximate to said position location server.

11. A system for distributing satellite navigation data, comprising:
    a plurality of reference stations configured to process satellite signals to generate a respective plurality of satellite navigation data streams and form packets in response to said plurality of satellite navigation data streams to generate a plurality of packetized satellite navigation data streams; and a processing system configured to receive each of said plurality of packetized satellite navigation data streams, removing duplicate packets within said plurality of packetized satellite navigation data streams to generate a combined packet stream, and send said combined packet stream into a communication network.

12. The system of claim 11, wherein said processing system includes a processor configured to decode satellite navigation data within said combined packet stream to generate satellite data.

13. The system of claim 12, wherein said satellite data comprises at least one of ephemeris data, almanac data, ionosphere data, universal time offset data, satellite health data, and raw data bits.

14. The system of claim 11, wherein said plurality of satellite navigation data streams comprises global positioning system (GPS) satellite navigation messages, and wherein each of said packets includes a sub-frame of said GPS satellite navigation messages.

15. The system of claim 14, wherein each of said packets includes a header having a satellite identifier and a time-of-week (TOW) value.

16. The system of claim 15, wherein each of said duplicate packets is removed in response to said satellite identifier and said TOW value associated therewith.

17. The system of claim 11, wherein said processing system comprises a hub, and the system further comprises:
a position location server configured to receive said combined packet stream.

18. The system of claim 17, wherein said position location server comprises:

a processor configured to decode satellite navigation data within said combined packet stream to generate satellite data, and a memory configured to store said satellite data.

19. The system of claim 17, further comprising:

an additional reference station disposed proximate to said position location server configured to provide at least one additional packetized satellite navigation data stream;

wherein said position location server comprises:
a processor configured to remove duplicate packets within said combined packet stream and said at least one additional packetized satellite navigation data stream to generate another combined packet stream and decode satellite navigation data within said other combined packet stream to generate satellite data; and a memory configured to store said satellite data.

20. An apparatus for distributing satellite navigation data, comprising:

means for processing satellite signals at each of a plurality of reference stations to generate a respective plurality of satellite navigation data streams;

means for forming packets in response to said plurality of satellite navigation data streams to generate a plurality of packetized satellite navigation data streams;

means for sending each of said plurality of packetized satellite navigation data streams to a processing system;

means for removing, at said processing system, duplicate packets within said plurality of packetized satellite navigation data streams to generate a combined packet stream; and means for sending said combined packet stream into a communication network.

* * * * *

UNITED STATES PATENT AND TRADEMARK OFFICE
CERTIFICATE OF CORRECTION

PATENT NO.      : 8,660,792 B2
APPLICATION NO. : 13/094984
DATED           : February 25, 2014
INVENTOR(S)     : Podshivalov It is certified that error appears in the above-identified patent and that said Letters Patent is hereby corrected as shown below:

In the Claims

Claim 1, column 6, line 19, replace "to generate combined packet stream" with --to generate a combined packet stream--.

Signed and Sealed this
Tenth Day of June, 2014

Michelle K. Lee
*Deputy Director of the United States Patent and Trademark Office*